United States Patent [19]

Armstrong et al.

[11] 4,191,725

[45] Mar. 4, 1980

[54] METHOD OF ASSEMBLING A CONTRAST ENHANCED DISPLAY

[75] Inventors: James B. Armstrong, Phoenix; J. Robert Trimmier, Glendale, both of Ariz.

[73] Assignee: Sperry Corporation, New York, N.Y.

[21] Appl. No.: 920,022

[22] Filed: Jun. 28, 1978

[51] Int. Cl.² .......... B29F 1/08; H01J 9/20

[52] U.S. Cl. .......... 264/261; 29/25.11; 29/25.13

[58] Field of Search .......... 29/25.11, 25.13; 313/462, 478, 480; 358/352, 353; 249/90; 264/261

[56] References Cited

U.S. PATENT DOCUMENTS

| | | | |
|---|---|---|---|
| 2,734,142 | 2/1956 | Barnes | 313/478 |
| 2,857,931 | 10/1958 | Lawton | 264/261 |
| 3,274,421 | 9/1966 | Johnson | 313/462 |
| 3,873,868 | 3/1975 | Robinder | 358/252 |
| 3,879,627 | 4/1975 | Robinder | 358/252 |
| 3,946,267 | 3/1976 | Lustig et al. | 358/252 |

*Primary Examiner*—John McQuade
*Attorney, Agent, or Firm*—Howard P. Terry

[57] ABSTRACT

A transparent face plate for a bright display device, such as an airborne cathode ray indicator often viewed under high ambient light intensities, is bonded directly to the viewing face of the display device by a transparent bonding material dyed to provide an optical filter whose transmission characteristics, determined in part by the thickness of the colored bonding agent, are generally matched to the spectrum emitted by the phosphor within the cathode ray tube so as to provide an optimally contrast enhanced display. A unique assembly method and gasket arrangement are used to determine precisely the spacing between the face plate and the indicator viewing face and, therefore, the filter thickness, and to form a temporarily sealed cavity into which the colored or dyed bonding agent is injected and then polymerized.

8 Claims, 9 Drawing Figures

METHOD OF ASSEMBLING A CONTRAST ENHANCED DISPLAY

CROSS REFERENCE TO RELATED APPLICATIONS

The J. B. Armstrong, J. R. Trimmier U.S. patent application Ser. No. 878,860 for "Laminated Filter-Electroluminescent Reticular Index for Cathode Ray Display" filed Feb. 17, 1978 and issued Mar. 6, 1979 as U.S. Pat. No. 4,143,404 and the J. B. Armstrong, J. R. Trimmier, R. A. Wallace U.S. patent application Ser. No. 920,090 for "Contrast Enhanced Cathode Ray Indicator" filed concurrently herewith disclose subject matter related to the present invention and are also assigned to Sperry Rand Corporation.

BACKGROUND OF THE INVENTION

1. Field of the Invention

The invention relates to the construction of cathode ray indicators and other bright display devices suitable for use under wide ranges of ambient light conditions and, in more particular, concerns a method of constructing a unique combination of optical filter and external face plate device for operation with an otherwise conventional display in such a wide range of light levels.

2. Description of the Prior Art

Display devices such as cathode ray tubes with contrast enhancement filters are known in the prior art, as is the bonding of a face plate to the viewing face of a cathode ray tube. For example, television receivers often include a protective glass face plate which may be bonded to the viewing surface of the picture tube. Normally, this protective glass is either clear or acts as a neutral filter, absorbing substantially equally light over the entire visible spectrum.

In aircraft instruments and other panel displays designed for use in high brightness ambients, a great degree of contrast enhancement is required, leading to the use of more sophisticated optical band pass filters possessing one or more band pass regions.

In general, the prior filters are pre-assembled multiple-layer devices consisting of two transparent or glass-like sheets bonded together with a very thin transparent plastic layer, the multiple layer device being affixed at a later time to the viewing face of the display by an adhesive layer. One or more of the three layers of the original sandwich may be colored with an appropriate dye to provide the desired contrast enhancement filter characteristic. In one form, the prior art comprises a sandwich structure wherein the two glass-like sheets are transparent and the optical filter dyes are dispersed in the thin bonding material contained between the two sheets. The dyes are selected to pass a predetermined spectral portion of the light emitted by the display device, while absorbing upwards of ninety percent of light falling outside of the pass band region. The bonding material is desirably very thin in order to minimize thickness and weight of the filter sandwich. This places severe constraints on the colored bonding layer. The amount of light which passes through successive incremental portions of a given optical filter diminishes rapidly in geometrical progression as the number of such portions is increased in arithmetic progression (Lambert's Law); therefore, the fully transmitted output light level of a filter diminishes exponentially with the thickness of the filter for a constant density of absorbing centers. Specifically, for an optical absorber, the transmitted light intensity I at a given wavelength is given by the relationship:

$$I=I_0e^{-\alpha t}$$

where $I_0$ is the incident intensity, $\alpha$ is the optical absorption constant at that wavelength, and t is the filter thickness. It may be seen that for a given transmission, $\alpha$ and t are inversely related. Where t is to be made small, on the order of 0.1 mm. for this type of filter, $\alpha$ must be made large.

Two difficulties arise. The filter layer must contain a large concentration of dye which may be limited by the medium's ability to absorb the dye whose concentration must be accurately controlled. In addition, the optical transmission of the thin filter layer becomes extremely sensitive to small deviations from the ideal thickness. An alternative structure which substantially reduces this sensitivity is described in the C. D. Lustig, J. B. Thaxter U.S. Pat. No. 3,946,267 for a "Plural Filter System Cooperating With Cathode Ray Display with Lanthanum Host Phosphor Emission in Two Colors", issued Mar. 23, 1976 and assigned to the Sperry Rand Corporation. In this filter, the dye was introduced, instead, into the very much thicker glass layers, by the addition of the dye materials in the molten glass at the time of manufacture. The sensitivity to thickness variations was greatly reduced to about sixty times less for a 6 mm. glass thickness compared to the dyed bonding layer art. The particular two filter plates used by Lustig et al are readily purchased on the market with precise thickness. However, obtaining glass with other specific dye characteristics, concentrations, and thicknesses can be very expensive and time consuming.

While the basic features taught by Lustig et al represent significant advances, the particular mechanical structure shown by way of illustration is found to be not altogether practical under all circumstances, particularly in airborne equipment. In any event, total assembly proves difficult and costly in the factory in view of the precision required to maintain consistently repeatable characteristics. The multiple layer assembly is normally bonded to the viewing face of the cathode ray tube with a bonding agent such as a clear epoxy material. This has been performed by placing a spacer of predetermined thickness between the cathode ray tube face and the filter assembly, taping the resultant permanent parts of the configuration to hold them temporarily in place, removing the spacer while hoping that the tape will constrain the spacing to remain correct, filling the cavity by pouring into it a liquid epoxy, curing the epoxy to form a solid transparent resin, removing the tape as waste material, and then coating the exposed periphery of the resin with a protective light trap finish or element.

While this prior assembly method is capable of producing a useful product if extreme care is exercised, the method is difficult to control and is very labor intensive and therefore expensive. Tolerances are difficult to be repeatedly and reliably met. Furthermore, the resulting display device has proven to be more bulky and heavy then is consistent with goals for airborne apparatus. Additionally, in applications in which a graticule is desired in the combination, substantial parallax may exist between the graticule and the images to be viewed on the phosphor screen of the cathode ray tube.

SUMMARY OF THE INVENTION

The present invention relates to the construction of combination filter-face plate devices through which cathode ray or other bright displays may be viewed comfortably under a wide range of ambient light conditions. A contrast enhancement filter is employed using a relatively narrow pass band or bands for passing with greater intensity the light emitted by the display phosphor at the selected pass band wavelength and for absorbing the major portion of the white light normally scattered within the display phosphor and then into the observer's eyes. Light emitted by the phosphor at wavelengths lying outside the pass bands are likewise substantially absorbed.

The invention particularly provides a method for economically constructing such enhanced-contrast displays through the elimination of one of the glass-like layers of the prior art and the associated intermediate layer and through integrating the selective absorption function of the filter into the bonding layer itself. This feature beneficially reduces the weight and axial dimension of the bright display assembly. The method also retains the economy and flexibility of adapting the filter dye combinations in a polymerizable medium to match a variety of luminous source spectra.

Furthermore, the method permits relaxation of the degree of accuracy required adequately to control the thickness and uniformity of the filter element as a result of introducing the dyes into the relatively thick bonding layer of the filter assembly. This relaxation permits the use of a firm, but flexible spacing determining element to be used to control the axial thickness of the filter element. The method therefore includes the placement of an annular re-usable gasket-like device having an inwardly extending lip for predetermining the filter axial thickness, placing the gasket about the periphery of the indicator viewing face with the lip extending over the peripheral edge of the viewing face. The face plate is put under pressure on the side opposite the tube viewing face, thereby providing a well-defined, substantially closed chamber of constant predetermined axial thickness between the face plate and the viewing face of the cathode ray tube and bounded by the inner edge of the lip. A selectively colored bonding agent is injected into the cavity in liquid form, is cured, and the gasket-like device may then be removed and cleaned for re-use.

A further advantage of utilizing a relatively thick colored bonding layer is that the uniformity of the filter is essentially unaffected by the small deviations from flatness nearly always found on the faces of flat-faced tubes. These deviations, resulting from the face plate molding process, amount to a few thousandths of an inch, but would produce large variations in optical absorption in a filter assembly constructed using a very thin colored bonding layer. Therefore, by using a thicker colored layer, no special selection or processing of display tubes is necessary in order to use flat faced tubes of conventional manufacture.

DESCRIPTION OF THE PREFERRED EMBODIMENTS

Figure 1:
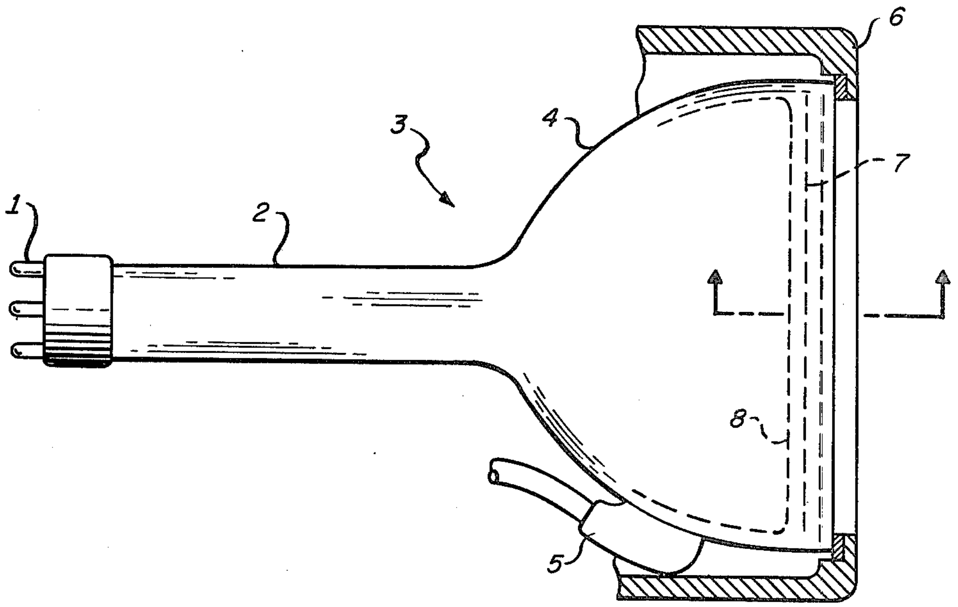
FIG. 1 is an elevation view, partly cut away, of a cathode ray display tube made in accordance with the present invention.

FIG. 1 is a view showing a cathode ray display tube 3 or other bright display device disposed in a case 6 adapted to be mounted in an aircraft panel. In the instance of a cathode ray tube, it will have the usual electrical terminals 1 projecting axially from a vacuum envelope including a cylindrical neck portion 2, a viewing face 7, and a transition section 4 joining the two latter elements. The vacuum tube 3 additionally cooperates with a separable anode potential connector 5 and may include the usual conventional internal elements (not shown) in the form of a cathode, an anode, an electron beam deflecting structure, and a phosphor screen 8 affixed to the inner surface of the viewing face 7. In the present invention, viewing face 7 of the display device is relatively flat as is the normal case with a variety of available bright display devices, though other viewing faces may be employed.

Figure 2:
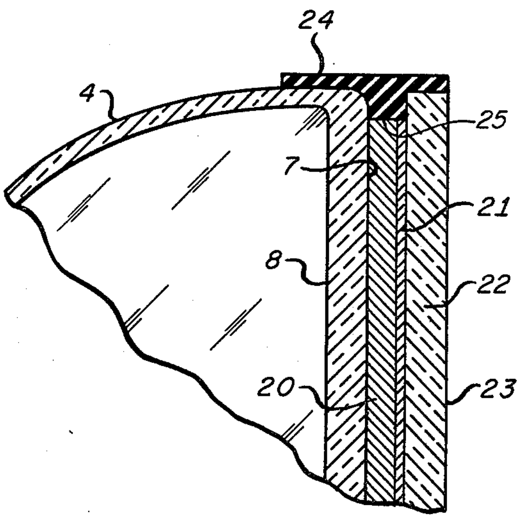
FIG. 2 is a fragmentary view on a large scale of a typical cathode ray tube made in accordance with the present invention.

FIGS. 1 and 2 are concerned with a structure in which a laminated filter-face plate system 20, 22 is affixed to the outside surface of the viewing face 7. The objective of the configuration is to present clearly to the viewer an undisturbed view of images formed by the electron beam on the cathode ray phosphor screen 8 within viewing face 7 under a wide range of ambient lighting conditions. Where a graticule 21 is to be applied at the inner surface of face plate 22, it is a further objective of the configuration to make possible an arrangement whereby the graticule indices may be viewed with minimum parallax under a wide range of ambient lighting conditions. It will be understood that a wide range of graticule patterns may be employed with the present configuration depending upon the application, such as for use in airborne navigation displays, terminal air traffic control, radar, data processing, or the like systems.

Figure 3:
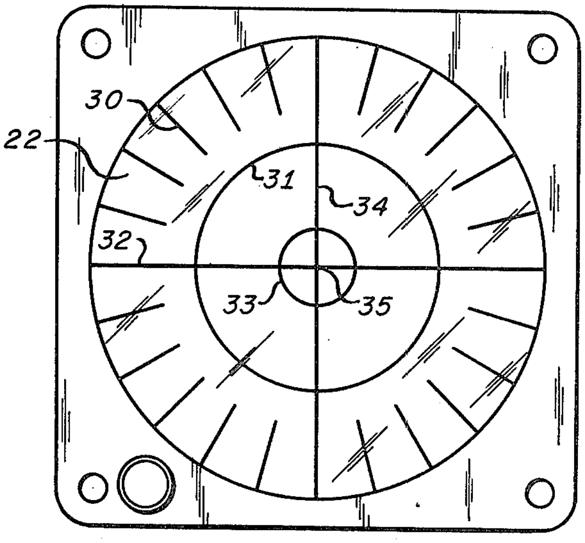
FIG. 3 is a front view of the indicator face plate showing a representative graticule.

FIG. 3 illustrates the locations of the various index lines 21 which may make up a bore sight type of graticule for the display in one of its applications. Each such line is located in a single plane lying on the inner surface of face plate 22 near the outer surface of the cathode ray tube viewing face 7 and therefore close enough to the cathode ray tube viewing face as to minimize parallax. As seen in FIG. 3, the index lines may include concentric circular lines for estimation of the radial deviation of an electron beam excited display on the cathode ray phosphor screen 8 from the center 35 of face plate 22, such as circular lines 31 and 33, as well as a plurality of radially disposed lines. The normally horizontal diametral line 32 and the normally vertical diametral line 34 serve to provide principal angular reference indices by defining four similar angular quadrants. A finer estimate of location of cathode ray tube images in each such quadrant may be afforded by the several radial lines arranged about the periphery of face 22 within each quadrant, such as the typical radial index line 30. It is desired that lines 30 through 34 be visible under a wide range of ambient lighting conditions and be as close to the face 7 of cathode ray tube 3 as possible to minimize parallax. The lines may be formed at or within the inner surface of face plate 22 by well known methods, such as by scribing, deposition, chemical etching, et cetera.

The light emitted by the cathode ray tube phosphor 8 is desirably limited to a predetermined relatively narrow region or regions of the visible spectrum by appropriate selection of the phosphor or phosphors. A typical phosphor is the conventional P-43 phosphor having most of its energy concentrated in the green and yellow portions of the optical spectrum. Accordingly, it is filtered in a particular manner by an absorbing or contrast enhancement filter formed preferably as a selective light absorbing adhesive layer 20 contained between the cathode ray viewing face 7 and the inner face of face plate 22 with no air gaps or voids. It is desirable that the materials of the cathode ray tube viewing face 8, face plate 22, and the adhesive filter layer 20 bonding them together have substantially the same index of refraction, thus eliminating undesirable reflections due to refractive mismatches at the several associated interfaces.

In general, the contrast enhancement filter 20, in the representative situation in which a P-43 phosphor is excited by the electron beam, may be generated by the admixture of two dyes, a blue cut-off or yellow dye and a green band pass dye, within a transparent polymerizable gel. Filter 20 may, for example, be made from a thermosetting resin of the general class of materials known as epoxides or epoxy resins, being based upon the reactivity of epoxide molecular groups. The green dye may form the main optical pass band, attenuating light having wavelengths substantially above and below its center wavelength. The representative yellow dye cuts off a further portion of the blue region of the spectrum and some of the green, as well. In practice, the green dye concentration roughly sets the center wavelength of the pass band. The yellow dye concentration is experimentally adjusted in relation to the green concentration more accurately to position the filter pass band about the phosphor emission maximum. The total concentration of the two properly proportioned colors or dyes may be experimentally varied to provide the desired level and location of the pass band transmission. Suitable dispersal or solvent media for the green and yellow dyes are readily available on the market, including epoxy materials. Other transparent media, including certain silicon materials, are also found to be suitable for this purpose.

Figure 4:
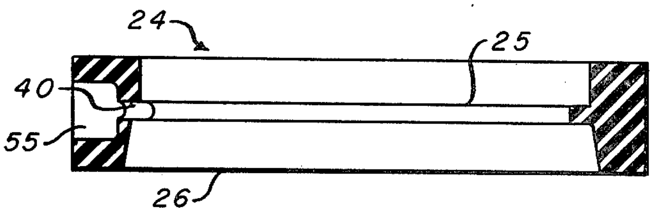
FIG. 4 is a cross section view of an element of the apparatus used in constructing the invention.

According to the invention, an apparatus as illustrated in FIGS. 4 through 8 is employed economically to mass produce bright display indicators in the form of cathode ray display contrast-enhancement filter-face plate combinations of desirably reduced size, weight, and cost and with precisely controlled filter characteristics through effective control of the uniformity of the thickness of the filter. In general, the method of assembling face plate 22 on cathode ray tube viewing face 7 includes the placing of a reusable annular flexible gasket 24, having an annular inwardly directed lip 25 of predetermined axial thickness, about its inner periphery at the viewing face 7 of cathode ray tube 3, with lip 25 extending over the peripheral edge of the viewing face 7. Then, face plate 22 is placed under pressure on the remaining exposed surface of lip 25. There is accordingly formed a substantially sealed chamber of constant axial thickness between face plate 22 and viewing face 7 into which the colored bonding agent may be injected. The bonding agent is introduced in liquid state through a radial opening 40 in gasket 24 (FIG. 4). Displaced air automatically leaves the cavity through bore 40 as the cavity is filled with liquid. The bonding agent is then cured to form the solid filter 20 and gasket 24 may be removed and cleansed for re-use. The annular notch vacated by lip 25 is painted with a non-transparent finish or is suitably filled so that undesired reflections are avoided.

Figure 5:
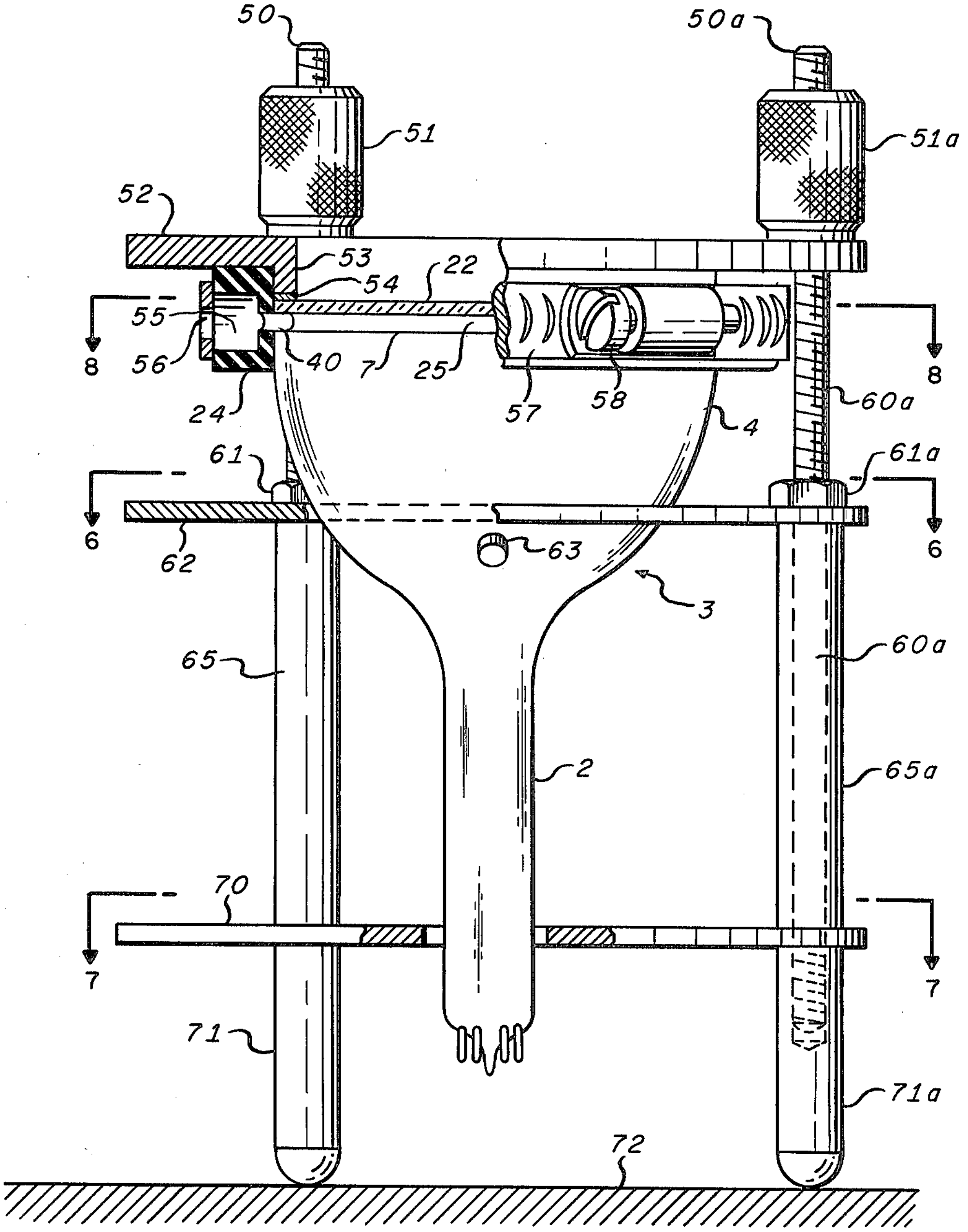
FIG. 5 is an elevation view partly in section of novel apparatus used in carrying out the invention.
Figure 6:
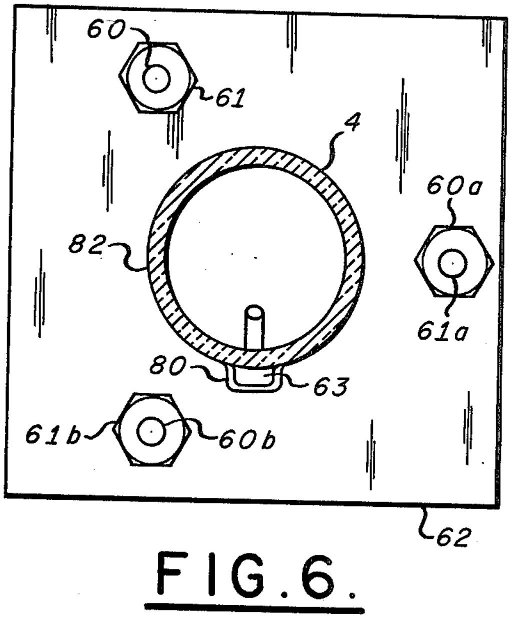
FIGS. 6 and 7 are views, partly in cross section, of portions of the apparatus viewed along lines 6—6 and 7—7 of FIG. 5.
Figure 7:
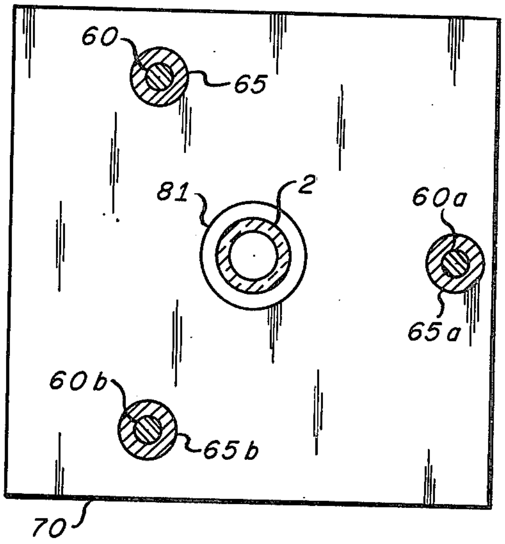

Referring particularly to FIGS. 5, 6, and 7, a fixture is illustrated for carrying out the assembly process during manufacture of the display according to the present invention. The fixture has three vertical hollow tubular spacers 65, 65*a*, 65*b* determining the locations of first and second respective centrally apertured horizontal plates 62, 70. Threaded rods 60, 60*a*, 60*b* extend through the respective spacers 65, 65*a*, 65*b*. The threaded rods 60, 60*a*, 60*b* also extend through the second apertured plate 70, below which they are fastened in internally threaded bores within the three respective legs 71, 71*a*, 71*b*. The nuts 61, 61*a*, 61*b* threaded above plate 62, when tightened, form the plates 62, 70, spacers 65, 65*a*, 65*b*, and legs 71, 71*a*, 71*b* into a rigid framed-like fixture.

The threaded rods 60, 60*a*, 60*b* extend upward from apertured plate 62 where their respective upper ends 50, 50*a*, 50*b* are adapted to receive a flat ring shaped clamping or pressure element 52. The latter has three equally spaced clearance holes so that it may pass over threaded rods 60, 60*a*, 60*b*. Above flat pressure clamp 52, three knurled nuts 51, 51*a*, 51*b* are accommodated on the respective threaded rods 60, 60*a*, 60*b* so that pressure may be placed on element 52. Flat pressure element 52 has a large central opening for viewing filter 20 while it is being formed. Further, it has a downwardly directed annular ring 53 whose outer vertical surface may be substantially aligned with the outer diameter of viewing screen 7.

Further parts needed for practicing the invention are a gasket-like device 24 and a circular clamp 56, 57, 58 capable of surrounding the latter. The annular gasket 24 is shaped generally as illustrated in FIG. 4 with an internal lip 25, whose axial width, as previously noted, determines the thickness of the optical filter. Gasket 24 is uniform in cross section about its axis except for one perturbation in the form of a radially located generally cylindrical port 55 with a bore 40 passing radially from the floor of port 55 through the inner circular surface of annular lip 25. As is seen in FIG. 5, circular clamp 56, 57, 58 is adapted to be slid in place over the external periphery of gasket 24, and being similar to a conventional hose clamp, may be tightened against that periphery by rotating screw 58 against the partial threads 57. Before tightening screw 58, a hole at 56 through the threaded part of the clamp is aligned with port 55. The various parts of the over-all fixture are constructed of materials which will withstand the conditions of temperature, et cetera, associated with the practice of the invention, as will be further described.

The fixture of FIG. 5 and gasket 24 are used repeatedly so that the manufacture of a display begins with a routine inspection thereof to discover and remove any loose particulate matter from the fixture and any residual epoxy in gasket 24. The viewing face 7 of cathode ray tube 3 and the inner side of face plate 22 are each successively subjected to the same cleaning program in which the surfaces are thoroughly cleaned with reagent grade acetone. Repeating that process for a second time, a detergent cleaning and rinse step then follows immediately. A conventional dilute detergent fluid is next applied with a clean tissue and the surface is scrubbed. The surface is completely rinsed at once with deionized water and is blown dry in a flow of clean compressed air or nitrogen. Care is used during this cleaning process not to scratch either surface of face plate 22, since these surfaces may be respectively occupied by graticule 21 and by an anti-reflection coating 23. Care is also used to set cleaned parts aside in dust proof containers until successive steps are undertaken.

The re-usable gasket 24, formed of a commercially available elastomer, is prepared for use by removal of any residual matter, especially in the region of port 55 and opening 40. A standard mold release material, such as a liquid dispensed fluorocarbon, is applied to gasket 24, to the circular gasket clamp 56, 57, 58, and to the lower surfaces of pressure plate 52. The parts are set aside to dry in a dust free environment.

Next undertaken is the assembly of the cathode ray tube 3 in the fixture as shown in FIG. 5, the fixture being set upright on bench surface 72 with ring shaped pressure element 52 uppermost. The cathode ray tube 3 is carefully placed in the fixture, pressure element 52 having first been removed. Tube 3 is aligned with the fixture so that the exposed anode terminal 63 passes safely through slot 80 extending radially from aperture 82 in plate 62 (FIG. 6) as tube 3 is moved downward. As in FIG. 7, the neck portion 2 of the tube is permitted to pass through aperture 81 in the lower plate 70. The rubber gasket 24 is then oriented with its larger diameter opening 26 downward as seen in FIG. 4. The filler port 55 of gasket 24 is positioned ninety degrees from anode terminal 63. Gasket 24 is now slipped over the upper end of cathode ray tube 3, seating the bottom face of the inner annular lip 25 firmly against the upper face 7 of the tube as seen in FIG. 5.

Face plate 22 is now put into position; the surface bearing the graticule 21, if present, is placed in contact with the upper surface of rubber lip 25. If an anti-reflection film 23 is present, it will be at the external surface of face plate 22. If the graticule 21 is present, one of the diametral lines 32, 34 must be aligned with anode terminal 63.

The circular clamp 56, 57, 58 is next positioned around the outer periphery of gasket 24 with the clamp filler hole at 56 aligned with filler port 55 and screw 58 is tightened until the clamp 56, 57, 58 is just firmly snug about gasket 24. The inner vertical sides of gasket 24 should contact the periphery of face plate 22 all around its circumference. With the annular lip 53 of flat pressure plate 52 directed downwardly, the plate 52 is installed over threaded rods 60, 60*a*, 60*b* so that lip 53 contacts the upper surface of face plate 22. If desired, a thin cushioning layer 54 of a tetrafluoroethylene or similar tape may first be applied over the contact surface of lip 53.

The next step is to run the three knurled clamp nuts 51, 51*a*, 51*b* downward on the respective threaded rods 60, 60*a*, 60*b* to within about a quarter of an inch of the top of the flat pressure plate 52. The neck 2 of cathode ray tube 3 must then be centered in circular aperture 81 in the lower plate 70 and nuts 51, 51*a*, 51*b* are run down, again into contact with the flat pressure plate 52. In circular sequence, each of nuts 51, 51*a*, 51*b* is tightened slightly with the thumb and forefinger, applying approximately the same torque to each nut 51, 51*a*, 51*b* in turn, but increasing the applied torque each time around the sequence until nuts 50, 50*a*, 50*b* cannot be tightened further with the thumb and forefinger. The assembly is now finally made ready to fill the filter cavity with a colored epoxy gel by placing it on its side, as in FIG. 8, with the filler port 55 up. Screw 58 may then be tightened one turn to firmly seat the gasket. A light coating of the mold release material may then be sprayed on the exposed face plate surface at 23 to protect the surfaces from subsequent spills of bonding material.

Preparation of the liquid epoxy material is generally similar to that used in preparing various thermosetting resins of the epoxy type. In one example, according to the practice of the invention, the following procedure yields sufficient material to form at least one such filter. Obtain a new can of Gerisch Transparent Green Concentrate; thoroughly mix its contents together as is conventionally done to prepare ordinary paint for use. The original material is a particular product of Gerisch Products, Torrence, California. Six grams of the original green concentrate are then thoroughly mixed with 80 grams of Eccogel 1265 Part B to form a secondary concentrate. The Eccogel materials are similar to clear epoxy materials widely available on the market and are sold under the trade name Eccogel by Emerson-Cummings of Canton, Massachusetts. A magnetic stirring device is used to provide several hours of thorough stirring of the secondary concentrate. Into a 100 ml. glass beaker, 30 grams of Eccogel 1265 A material and 24.6 grams of Eccogel 1265 B material are poured along with the dye or dye concentrate to be employed, such as 5.4 grams of previously prepared secondary green color concentrate and 1.05 grams of yellow dye powder, if both dyes are to be used. The yellow or blue cut off dye may be a dye known as Plasto yellow MGS, made by the Keystone Aniline and Chemical Company of Chicago, Illinois as its product number 806-040-50. The combination is covered and placed for five minutes in a first oven heated at 80° C. It is removed from the first oven, stirred using a magnetic stirrer, and is placed in a vacuum oven heated at 80° C. The atmosphere within the covered beaker is then evacuated for one minute longer than it takes for the froth on the surface of the hot liquid to disappear. The beaker is then returned to the original 80° C. oven and the liquid is heated for an additional five minutes.

Figure 9:
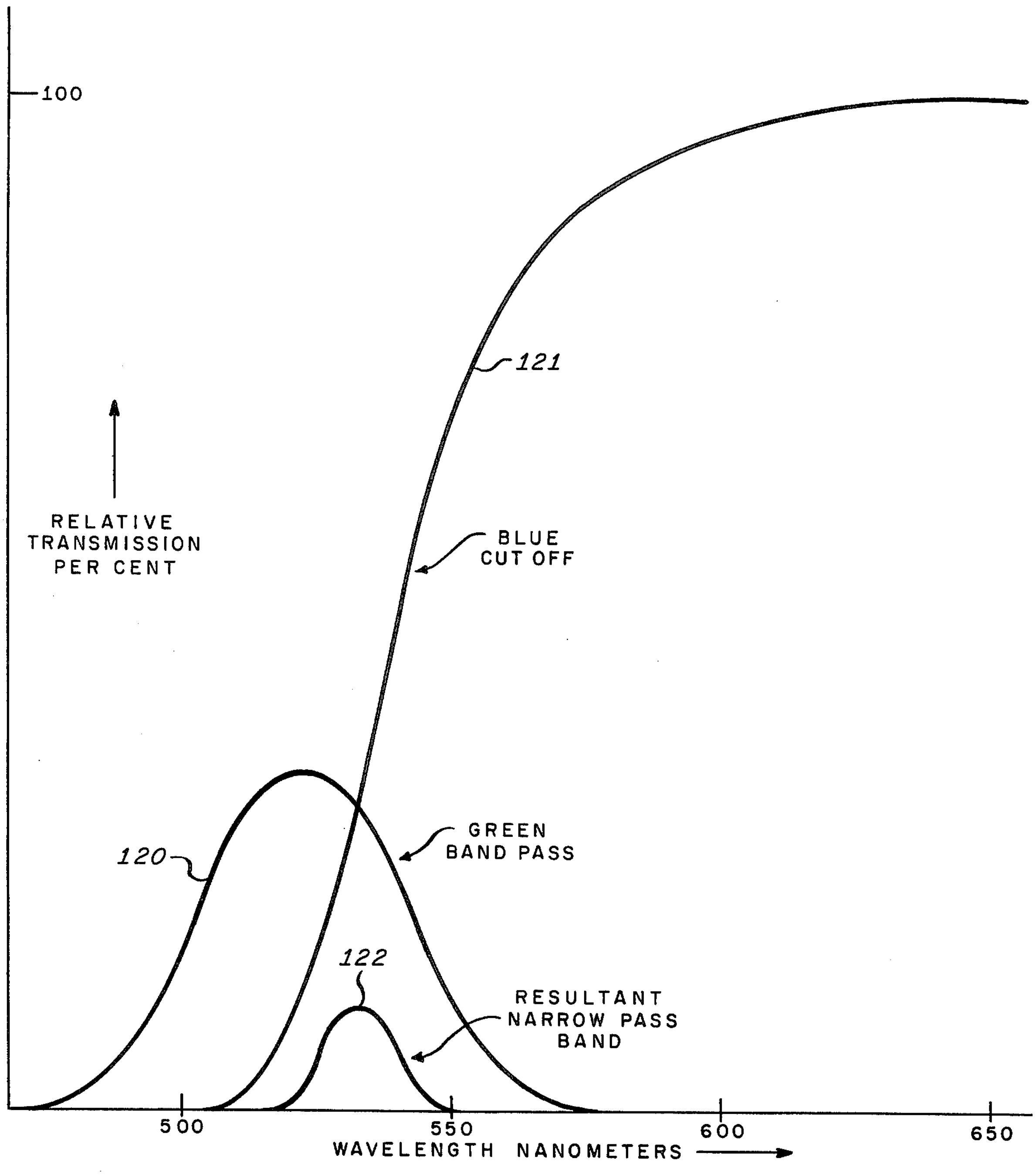
FIG. 9 is a graph useful in explaining the operation of the invention.

The foregoing example is to be considered simply as presenting one possible combination of colorants which may be used according to the invention, because many other combinations of colorants or dyes are available on the market which may be selected using ordinary selection techniques according to the particular spectral characteristics of the phosphor used within the display tube. In the foregoing example, the representative green dye forms the main pass band 120 of FIG. 9, attenuating light having wavelengths above and below its central wavelength. The representative yellow dye cuts off a further portion of the blue region of the spectrum and some of the green, as well, as at 121. In this specific combination, the green dye roughly sets the center wavelength of the pass band. The yellow dye concentration is experimentally adjusted in relation to the green dye concentration to position the filter pass band 122 about the phosphor emission maximum. The total concentrations of the two dyes are experimentally determined in the usual manner and provide the desired level of pass band transmission.

Figure 8:
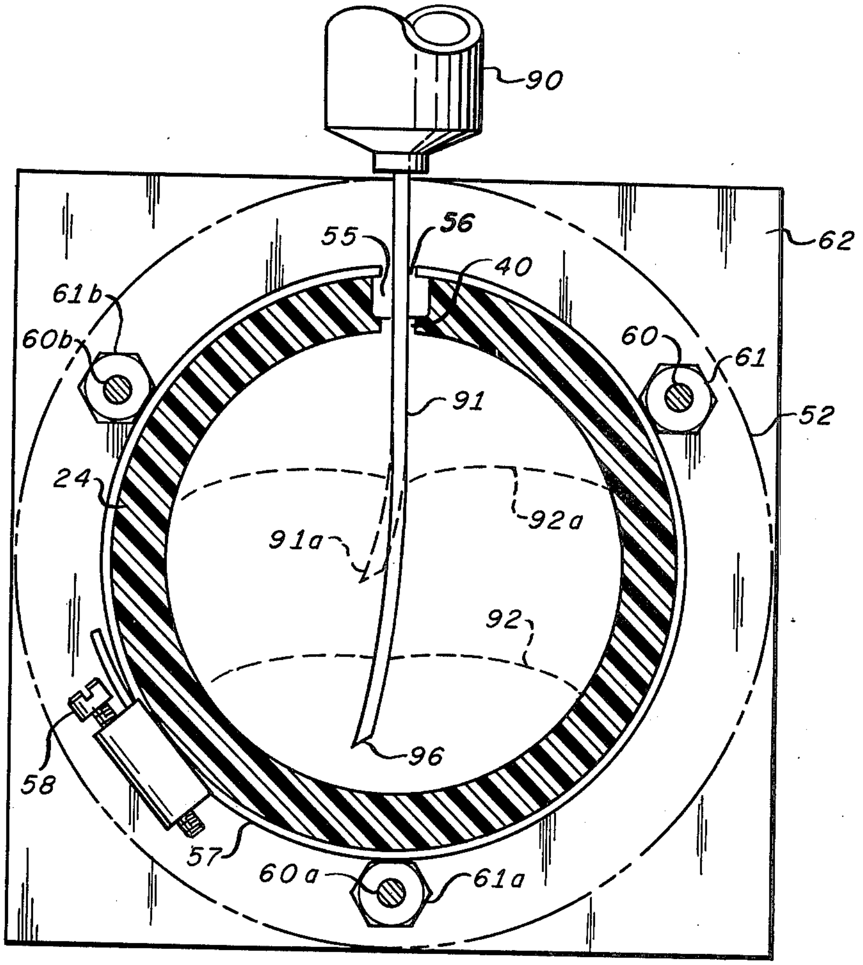
FIG. 8 is a view, partly in cross section, of the apparatus of FIG. 5 taken on line 8—8 of FIG. 5 with the apparatus placed on its side for filling.

Before the process of filling the filter cavity is begun, the cathode ray tube 3 and its supporting fixture, in the attitude shown in FIG. 8, are placed in an oven to bring their temperatures up to 80° C. Now, referring further to FIG. 8, a 10 ml. hypodermic syringe 90 with a 19-gauge needle is assembled. A length of 20 gauge elastomer sleeving 91, say 2.75 inches long, is prepared, cutting one end 96 at a significant slant, and its square end is forced over the hypodermic needle, as in FIG. 8. Sleeve 91 is preferably of a solid tetrafluoroethylene polymer.

The epoxy-dye liquid mixture and cathode ray tube 3 as shown in FIG. 8 are brought to a common working space. The plunger is removed from the syringe; next, 10 cc. of the epoxy-dye mixture is carefully poured along one inner side of the syringe envelope to avoid creating or entrapping air bubbles within the mixture. The plunger is then inserted just barely into the syringe 90; the syringe is immediately inverted so that any bubble present in the liquid rises to the needle end of the syringe. When any air bubble has risen to the outer end of the needle, slow depression of the plunger will eliminate bubbles.

Syringe 90 is at once rotated to its original position with the end 96 of the sleeve 91 down. Sleeve 91 is inserted through hole 56, port 55, and opening 40 down in the filter cavity to within substantially a quarter of an inch from the bottom of the cavity, generally as indicated by the position of sleeve 91 in FIG. 8. Making certain that sleeve 91 does not become dislodged from the syringe needle and that formation of bubbles is prevented by having the tip 96 of sleeve 91 remain submerged in a pool of the discharged epoxy mixture as indicated at 92, the filter cavity is progressively filled until the epoxy nears the top of the cavity, as at 92*a*.

As the epoxy material nears the top of the filter cavity, the syringe 90 and sleeve 91 are withdrawn by, say 1.25 inches; but end 96 must not be withdrawn above the level of the epoxy liquid (such as level 92*a*). The reference numeral 91*a* now represents a typical location of the end of the filter sleeve. Filling of the filter cavity is continued slowly while any remaining air bubbles are progressively forced out of the filter cavity. Filling is continued until port 55 in gasket 24 is half filled with the epoxy material. Now, sleeve 91 is withdrawn entirely from the cavity assembly and enough of the epoxy mixture is added completely to fill port 55. It is preferred, in completing the filling procedure that no epoxy be present in port 55 until any air bubbles remaining within the filter cavity emerge into the port as the filling of the cavity is completed.

The tube 3 and the fixture in the attitude of FIG. 8 are placed in an 80° C. curing oven to effect curing of the epoxy materials for a minimum of six hours at 80° C. Unused epoxy liquid remaining in the syringe is discharged into a small cup marked with a symbol to correspond to a symbol applied only to a corresponding cathode ray tube and the hypodermic syringe assembly is discarded. The epoxy sample of the cup is cured by placing it in the oven along with the tube and assembly. At the end of the six hour curing period, the state of the epoxy sample may be examined to determine if that in the filter has adequately cured. The cure is deemed satisfactory for the particular materials used if the surface of the sample has only a light tacky feel when touched with the finger and, for example, if the epoxy does not stretch more than about 0.031 inches as the finger is withdrawn from its surface. If the cure is deemed not to be satisfactory, heating of the filter and sample is continued for two additional hours in the 80° C. curing oven.

When curing is complete, the cathode ray tube 3 and its fixture are removed from the curing oven, and the assembly is placed on a bench top in the vertical attitude shown in FIG. 5. Immediately, screw 58 of the circular clamp 56, 57, 58 is loosened and knurled nuts 51, 51*a*, 51*b* are removed from the respective threaded rods 60, 60*a*, 60*b*. The flat pressure plate 52 is lifted and removed from the assembly, as well as ring clamp 56, 57, 58. The gasket 24 is carefully loosened slightly from the entire periphery of filter 25. Next, starting at port 55, flexible gasket 24 is stretched until it can be slipped entirely off the new display. The cathode ray tube, still in the remainder of its fixture assembly, is set aside to cool, after which tube 3 may be removed from the fixture.

The removal of gasket 24 leaves an annular indentation or groove around filter 20 vacated by the consequent removal therefrom of annular rubber lip 25. This may be filled additionally to strengthen the bond between the several parts and for cosmetic purposes by the use of a conventional polymerizable flexible material, for example. First, the walls of the groove are washed with acetone from a spray bottle and are allowed to dry. To apply the filler, a 3/32 inch long stubby 16-gauge needle is coupled to a 3 cc. hypodermic syringe and the latter is two thirds filled with a material such as black adhesive sealant of the general type sold under the trade name Silastic and available from Dow Corning, for example. The black sealant is applied, filling the groove between the peripheries of the viewing face 7 and face plate 22 with an excess of material, but not disturbing the previously cast epoxy filter material. At the completion of the sealant application, it may be smoothed to form a uniform light-proof fillet. As with other suitable room-temperature curing polymers, the sealant is self-curing in about twenty-four hours at room temperature. After the sealant is safely cured, the exterior face of face plate 22 may be cleaned by repeating the acetone, detergent, deionized water, and gas flow cleaning process originally used to clean the viewing face 7 of cathode ray tube 3.

It is seen that the invention represents an improvement in the art of making bright, contrast enhanced, electronic display devices, a method permitting relaxed control of the thickness of the bonding filter, eliminating formerly used extra layers and reducing the overall length, the weight of the assembly, and parallax between the front plate of the assembly and the cathode ray tube phosphor. The assembly process is simplified, the number of assembly steps and parts being reduced. It is seen that the novel method provides for the manufacture of a filter-face plate device through which a bright display may be viewed comfortably under a wide range of ambient light conditions. Image contrast is enhanced and the viewer is provided with significantly improved, independent control over the relative brightnesses of the display by means not characterized by the defects of prior art systems. A transparent face plate configuration is provided that overcomes deficiencies present in prior art bright displays, being of particular merit for use where the display may be subjected to a wide range of levels of ambient light brightness. It is bonded directly to the viewing face of the indicator with a transparent bonding material which itself contains a predetermined dye or dyes so that the bond acts as an optical filter, both matching the spectrum of the phosphor of the display device and yielding an optimally contrasting and enhanced display. The face plate may accommodate with reduced parallax various types of index marking systems, including an electroluminescent graticule pattern.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A method for forming a filter-face plate combination on the viewing face of a bright display device incorporating the steps of:

supporting said bright display device with said viewing face upward, placing an elastomer gasket on the periphery of said bright display device viewing face, said gasket having an inner annular lip, one side thereof being adapted to contact said viewing face generally at the periphery thereof, placing a transparent face plate on the opposite side of said annular gasket lip, applying pressure to said face plate generally at the periphery thereof thereby to form a cavity defined by said viewing face, said face plate, and the inner surface of said gasket lip, except for a generally radial filler hole extending through said gasket and communicating with said cavity, reorienting said bright display device so that said radial filler hole is substantially vertical, filling said cavity through said radial filler hole with a curable polymer material which includes colorants to provide the desired optical filter characteristics while avoiding formation of bubbles, curing said polymer material, removing said pressure from said face plate, and removing said elastomer gasket from said bright display device.

2. The method as described in claim 1 wherein the step of filling said cavity includes:

heating a selectively colored, curable polymer material to produce a desired viscosity of said polymer material at a predetermined temperature.

filling a syringe device with said heated polymer material and removing any gas therefrom, inserting said syringe device into said cavity through said radial filler hole so that the output thereof is adjacent the lower portion of said cavity, operating said syringe device to extrude the heated polymer material into said cavity and withdrawing said syringe device while maintaining said output below the surface of the extruded polymer material, thereby minimizing formation of bubbles.

3. The method as described in claim 2 further including the step of preheating said bright display device simultaneously to substantially the same predetermined temperature as said heated polymer material.

4. The method as described in claim 3 wherein the step of filling said cavity follows a preliminary step of introducing at least a first light absorbing dye material characterized by a first optical wavelength pass band into said curable heated polymer material substantially at said predetermined temperature.

5. The method as described in claim 4 wherein the step of filling said cavity follows the preliminary steps of:

introducing said first and a second light absorbing dye material characterized by a second optical transmittance characteristic into said curable heated polymer material substantially at said predetermined temperature to produce a colored, thermally curable polymer material in liquid form, and stirring said colored, thermally curable polymer material for thoroughly and uniformly mixing said dye materials therein.

6. The method as described in claim 5 in which the step of applying pressure to said transparent face plate generally at the periphery thereof includes moving a circular pressure plate into contact with said face plate periphery and uniformly increasing said pressure to a predetermined level thereby to define the thickness of said cavity and the resultant optical filter.

7. The method as described in claim 6 including the preliminary step prior to placing said elastomer gasket in the periphery of said display device viewing face of applying a thin layer of mold releasing material to the surfaces of said elastomer gasket contacted by said polymer material.

8. The method as described in claim 1 including the final step of applying within the annular indentation formed in the periphery of said filter by said gasket lip upon removal thereof with a polymerizable flexible material and subsequently curing the latter material.

* * * * *